July 26, 1927.
R. STRESAU ET AL
1,637,318
ELECTRICALLY WELDED PIPE COUPLING AND METHOD OF MAKING THE SAME
Filed Dec. 20, 1922
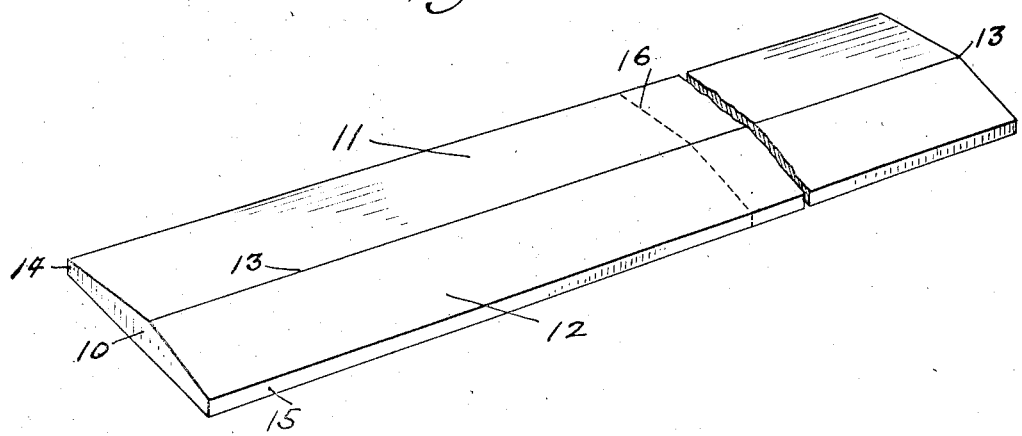
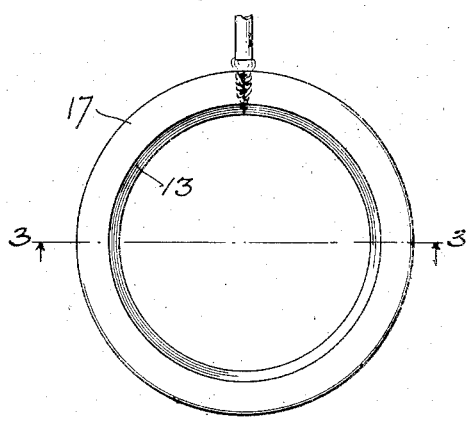
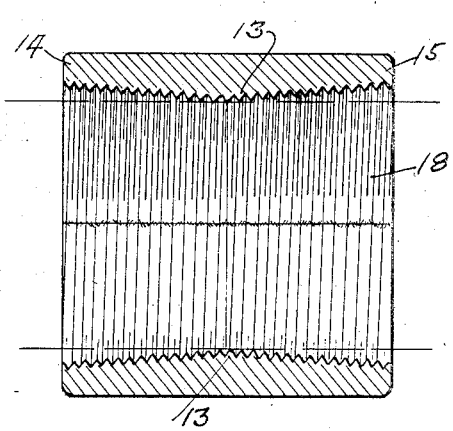
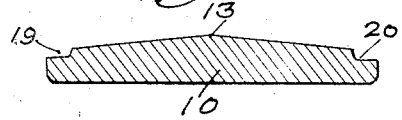
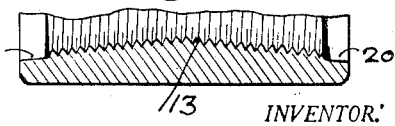
WITNESS:
INVENTOR:
Richard Stresau and
BY Harry Woodhead.
ATTORNEYS.

Patented July 26, 1927.

1,637,318

UNITED STATES PATENT OFFICE.

RICHARD STRESAU, OF WAUWATOSA, AND HARRY WOODHEAD, OF MILWAUKEE, WISCONSIN, ASSIGNORS TO A. O. SMITH CORPORATION, OF MILWAUKEE, WISCONSIN, A CORPORATION OF NEW YORK.

ELECTRICALLY-WELDED PIPE COUPLING AND METHOD OF MAKING THE SAME.

Application filed December 20, 1922. Serial No. 608,111.

Our invention relates to pipe couplings, and also to the methods of manufacturing the same.

Ordinarily, pipe couplings are made by lap welding the ends of a short metal strip which is rolled into annular form, and in which the gauge of the metal is uniform throughout the width of the strip. The couplings thus produced are completed by boring out, so as to provide tapered openings extending from each end of the coupling toward the middle transverse section thereof. In the operation of boring large couplings so made, an excessive amount of metal must be removed at the ends from the inside of the coupling of uniform interior diameter, in order that in a subsequent operation the threads may be cut on lines which taper inwardly from the ends of the coupling.

In producing our improved coupling, the openings which are to be screw threaded, and prior to the threading operation, are made in the initial forming operation to properly taper from the ends of the coupling toward the middle thereof, so that boring out is entirely dispensed with, and it is not required in the threading operation that any excess of metal adjacent the ends of the couplings be removed, as heretofore. The threads will be of uniform depth throughout their course.

In reducing our invention to practice, we first produce, by rolling, a metal strip of special shape having upon one of its broader sides a longitudinally extending central ridge or angle from which oppositely inclined plane surfaces extend laterally to the edges of the strip, so as to produce a bar which preferably but not necessarily in any cross section has the form of an irregular pentagon. But in any cross sectional form of the bar, the ridge feature to produce the tapered openings in the ends of the coupling is preserved.

From the strip of special shape thus produced, we cut a short section having a length equivalent to the circumference of the pipe coupling to be produced therefrom. The short section cut from the strip is then shaped by rolling or bending into tubular form, with the squared ends of the strip disposed in abutting relation, the ridge referred to now extending circumferentially about the interior of the coupling blank, so as to produce a tubular blank having openings which taper from the ends toward the interior, and with a constriction at or near the line of their convergence, from which the openings flare to the ends of the coupling. We then weld the meeting ends of blank along the line of the abutting edges, so as to completely and permanently unite such edges and produce an integral structure. Such integral structure may be produced by butt welding the squared ends, or by grooving them in their meeting line so as to permit arc welding by the deposit of successive layers of welding metal, the method of welding being optional.

The tubular blank formed as above described is then tapped or screw threaded at both ends, the tapering formation of the openings permitting such threading operations to be performed with a minimum expenditure of power and with but little strain upon the taps, by reason of the reduction in the amount of material required to be displaced in the threading operation.

The novel features which reside in the invention will now be described in detail and pointed out in the appended claims.

In the drawing which accompanies this specification:

Figure 1 is a perspective view of a strip of metal specially rolled so as to present upon one of its wider faces a longitudinally extending ridge from which oppositely inclined plane surfaces extend to the edges thereof, and having in cross-section the angular outline above described.

Fig. 2 is an end view showing the formation of the improved tubular coupling produced from a section of such strip and the manner in which the abutting edges thereof are welded.

Fig. 3 is a longitudinal central sectional view of the coupling on the line 3—3, Fig. 2, looking in the direction of the arrows, and showing the arrangement of the screw threads which extend interiorly on lines tapering from the ends to the transverse central line of the coupling, to facilitate threading and easy joining of the pipe sections.

Fig. 4 is a cross sectional view of a specially rolled strip of modified construction which is provided with marginal recesses, which in the completed coupling provide a clearance for the easy entry into the coupling of the threaded ends of the pipe sections.

Fig. 5 is a longitudinal sectional view through a portion of a threaded coupling showing the clearance referred to.

In carrying out our invention, we employ a metal strip 10 specially rolled so as to have ordinarily the cross sectional contour shown in Fig. 1, such strip having a width and a thickness which will adapt it to the production of couplings of the desired length and diameter. The side margins of one of the broader faces of the strip are beveled oppositely as at 11 and 12, from a line at or near the longitudinal center thereof, so as to produce a ridge or angle 13. In cross section the strip is shown as in the form of an irregular pentagon, but it is obvious that the lower corners 14 and 15 may be rounded or formed otherwise instead of square. In all of the forms of the metal strip, the oppositely beveled feature of the construction is preserved, for the purposes of the invention.

From the strip produced as described, we cut a section of appropriate length, the ends of which may be squared for butt welding, or beveled to produce a V-groove, or groove of other contour, to facilitate fusion in arc welding. In arc welding it is desirable to form an exterior groove in thick gauge couplings, in order that a proper degree of fusion of the metal at the meeting ends of the coupling blank may be effected. The cutting line upon which the section is severed from the strip is indicated by the dotted line 16 in Fig. 1. The short section is then rolled or otherwise shaped into tubular form to produce the ring 17, with the ends of the strip disposed in abutting relation, as shown in Fig. 2, and with the ridge 13 extending circumferentially about the interior thereof. The location of the ridge 13 with relation to the strip 10, is such that when the annulus is formed the ridge will be approximately at the mid-length of the coupling.

The ends of the section of the strip which have been brought into abutting relation in the circular plane of the coupling blank in the process of forming the annulus are then welded along their meeting line so as to produce an integral structure. We secure good results by employing an electric arc in the welding operation, as thereby we are enabled through the provision of the groove at the welding line to effect a thorough fusion of the metal in the region of the groove, the arc and coupling being traversed, one with relation to the other along the welding line, in the welding operation. Thus a perfect weld is produced, which extends entirely through the metal and is free from defect or blemish. If the ends of the section are cut square for butt welding, they will meet in the same radial plane when the annulus is formed. If beveled or cut away to form a welding groove, the lower thin edges forming squared ends may abut.

The practice of the operations described enables us to produce a coupling blank, the opening through which is made to taper from the ends of the coupling to a constricted line or point at or near the central transverse section of the same, and from which the openings flare oppositely to the ends of the coupling. This formation eliminates the boring out resorted to in producing the tapering openings, the purpose of which is to facilitate the formation of threads 18 within such opening. The tapered thread cutting taps which are used in the operation do not have to displace more of the metal from the tapering surfaces than is necessary to afford a proper seating for the threads, inasmuch as there is no excess of metal to be removed by preliminary boring out or in the threading operation, as is required in the case of a coupling uniform as to gauge and diameter of the opening, and therefore the threads are cut to uniform depth. As a result, the tapered threading is easily accomplished with a greatly lessened expenditure of power and strain upon the taps. The axially extending parallel broken lines in Fig. 3 indicate the excessive amount of metal lying outside thereof which must be removed by boring out large couplings or by the taps in threading the older form of coupling, in which the opposed surfaces are parallel and the gauge of the metal is uniform throughout the length of the coupling. The advantages of the present invention in the matter of manufacture of the coupling are obvious, as is also the facility with which pipe sections may be effectively coupled or joined together by reason of the tapered screw-threaded openings with which the coupling is provided.

Fig. 4 shows a modified form of the rolled metal strip which we use in making couplings of large size. The entry of the ends of the threaded pipe sections into the coupling will be greatly facilitated by providing a clearance permitting the correct positioning of the parts, so as to insure the proper engagement of the threads. We achieve this very desirable result by rolling into the strip 10, longitudinally extending depressions 19 and 20, on the face parallel with the ridge 13, as shown in Fig. 4, and also in Fig. 5.

The clearance thus provided also prevents accidental injury to the threads at the ends of the coupling.

While we prefer to employ arc welding it is obvious that other methods may be used.

Heretofore, elongated, tubular structures of considerable weight, such as ring frames for generators, have been produced from thick metal slabs by pressing such slabs into semi-circular form and uniting the ends of two of the curved slabs on their abutting, diametrical meeting lines by resistance welding, to produce an integral structure. This practice of producing such structures in two parts has been uniformly followed for the reason that in known welding methods, it has not been possible to exert upon an elongated, rigid, tubular, thick metal structure of this nature, formed from a single, thick metal slab, such external pressure as would serve to reduce even in a slight degree the diameter of the elongated, rigid structure so as to merge the fused meeting ends of the slab at the instant that such ends became heated to the proper welding temperature. But this difficult operation of welding by resistance the abutting ends of a single thick metal slab formed into an elongated tubular structure, by the application of external pressure at the right moment so as to overcome the inherent rigidity of the elongated, tubular, thick metal structure, and so perform the welding operation while the metal is under tension, we have successfully achieved.

It has also been the practice to form automobile wheel rims, and other annular articles whose length is brief compared with their diameter, from single strips of comparatively thin metal, which possess an inherent flexibility, permitting their easy bending in butt welding, for in such an article there is no degree of rigidity to be overcome, and the metal ring consequently not under tension.

We proclaim the difference between the production by electric welding of an integral ring-like structure of large diameter but of small length, produced from a single strip of comparatively thin metal which is so inherently flexible as to permit welding without placing the metal under tension, and the production by electric welding of an elongated tubular structure from a single thick metal slab, which in its tubular form is rigid and unyielding and cannot be welded until the stresses have been overcome and the metal has been placed under tension. We believe ourselves to be the first to have accomplished this result.

Our method of making interiorly oppositely tapered couplings saves the labor and expense of reaming out the tapered portions of the couplings and additionally results in the formation of superior couplings because the rolled interior surface is by reason of the rolling step tougher than if the surface had not been previously worked or rolled. There is no material wasted as by the heretofore practiced reaming step. The threads formed in the coupling as the last step are in a tougher surface and the coupling superior to those made by previous processes.

Having thus described our invention, what we claim and desire to secure by Letters Patent of the United States, is:

1. The method of making a pipe coupling, which consists in rolling a metal strip with longitudinally extending opposite slopes on one of its broader sides, converting the said strip into a tube with the sloped side upon its interior with the ends of the strip abutting, and electrically welding the abutting ends of the strip to constitute an integral tubular coupling having an inwardly tapering opening at each end.

2. The method of making a pipe coupling, which consists in rolling a metal strip with longitudinally extending opposite slopes on one of its broader sides, converting the said strip into a tube with the sloped side upon its interior with the ends of the strip abutting, electrically welding the abutting ends of the strip to constitute an integral tubular coupling having an inwardly tapering opening at each end, and then threading the tapered openings of the tube.

3. The method of making a pipe coupling which consists in deforming a metal bar substantially pentagonal in cross section by bending it into the form of a tube with the ends of the bar abutting to produce a tube with openings tapering from each end, electrically welding the ends together, and then threading the interior surfaces of the welded tube.

4. A pipe coupling made from a metal strip provided upon one of its broader sides with longitudinally extending surfaces which slope oppositely toward the edges of the strip, the said strip being formed into a tube with the sloped side disposed interiorly thereof, the meeting ends of the strip being welded to constitute an integral coupling having an inwardly tapering opening at each end, and the tapering openings being provided with screw threads.

5. A pipe coupling made from a metal strip with squared ends and provided upon one of its broader sides with longitudinally extending surfaces which slope oppositely toward the edges of the strip, the said strip being formed into a tube with the sloped side disposed interiorly thereof and the squared meeting ends of the strip electrically welded to constitute an integral coupling having an inwardly tapering opening at each end, and the tapering openings being provided with screw threads.

6. A pipe coupling made from a rolled metal strip provided upon one of its broader sides with a longitudinally extending ridge from which longitudinally extending surfaces slope oppositely toward the edges of the strip, the said strip being formed into a tube with the ridged side disposed circumferentially upon the interior thereof and the meeting ends of the strip electrically welded to constitute an integral structure with an inwardly tapering opening at each end, and the tapering openings being provided with screw threads.

In testimony whereof, we have signed our names at Milwaukee, this 4th day of December, 1922.

R. STRESAU.
H. WOODHEAD.